United States Patent
Fukuyama et al.

(10) Patent No.: US 6,532,246 B1
(45) Date of Patent: Mar. 11, 2003

(54) EXCIMER LASER APPARATUS

(75) Inventors: Hiromasa Fukuyama, Kanagawa (JP); Katsuya Toma, Kanagawa (JP); Motohiro Arai, Shizuoka (JP)

(73) Assignees: NSK, Ltd., Tokyo (JP); Ushio Denki Kabushiki Kaisha, Tokyo (JP)

( * ) Notice: Subject to any disclaimer, the term of this patent is extended or adjusted under 35 U.S.C. 154(b) by 183 days.

(21) Appl. No.: 09/657,653

(22) Filed: Sep. 7, 2000

(30) Foreign Application Priority Data

Sep. 7, 1999 (JP) ............................. P11-253240

(51) Int. Cl.⁷ ..................... H01S 3/22; H01S 3/223
(52) U.S. Cl. .................... 372/57; 372/58; 372/37
(58) Field of Search ..................... 372/37, 57, 58

(56) References Cited

U.S. PATENT DOCUMENTS

| | | | | |
|---|---|---|---|---|
| 5,848,089 A | * | 12/1998 | Sarkar et al. | 372/58 |
| 6,026,103 A | * | 2/2000 | Oliver et al. | 372/37 |
| 6,208,675 B1 | * | 3/2001 | Webb | 372/58 |
| 6,271,606 B1 | * | 8/2001 | Hazelton | 310/12 |
| 6,337,872 B1 | * | 1/2002 | Nara et al. | 372/58 |

FOREIGN PATENT DOCUMENTS

| | | | |
|---|---|---|---|
| JP | 10-173259 | 6/1998 | ........... H01S/3/036 |

\* cited by examiner

*Primary Examiner*—Paul Ip
*Assistant Examiner*—Davienne Monbleau
(74) *Attorney, Agent, or Firm*—Sughrue Mion, PLLC

(57) ABSTRACT

In an excimer laser apparatus comprising a laser chamber 1 filled with a laser gas, a discharge excitation portion 2 provided in the laser chamber 1, a rotary shaft 3 to which a gas circulating fan 4 for circulating the laser gas is fixed, a shield partition wall 61 for forming a sealed space to enclose the rotary shaft 3, a magnetic bearing of a control type including a rotor portion 32 provided on the rotary shaft 3 side and a stator portion 6 provided outside the shield partition wall 61 and serving to pivotally support the rotary shaft 3 in non-contact, a driving motor 13 provided outside the laser chamber 1, magnetic coupling portions 33, 11 and 121 for transmitting driving force of the driving motor 13 to the rotary shaft 3 through the shield partition wall 61 in non-contact, and rotary shaft sensors 8 and 9 for detecting a position of the rotor portion 32 with respect to the stator portion 6. The shield partition wall 61 of the magnetic coupling portions 33, 11 and 121 is formed of ceramic and the shield partition wall 61 of the magnetic bearing is formed of metal.

6 Claims, 5 Drawing Sheets

EXCIMER LASER APPARATUS

BACKGROUND OF THE INVENTION

1. Field of the Invention

The present invention relates to an excimer laser apparatus, and more particularly to an excimer laser apparatus which serves to pivotally support a rotary shaft of a fan for circulating a laser gas in a laser chamber and to give the rotating force of the rotary shaft by means of a driving motor provided outside the laser chamber.

2. Description of the Related Art

An excimer laser is excited by electron beams or discharging. In case of the electron beams, great output energy is obtained per shot. However, a repetitive operation is hard to perform and the size of an apparatus is increased. In general, an excimer laser apparatus of a discharge excitation type has a laser chamber for completely sealing a laser gas containing a halogen gas of high corrosiveness, in which a gas circulating fan is provided to circulate the laser gas and to feed the gas to a discharge excitation portion. In order to implement a high repetitive excimer laser apparatus, particularly, it is necessary to increase a gas circulation speed in the laser chamber. Thus, the high speed rotation of the gas circulating fan is required. In the excimer laser apparatus, moreover, it has been well known that a laser output light energy is reduced if impurities mix into the laser gas and the amount thereof is increased.

Conventionally, a ball bearing such as a deep groove ball bearing has been used as a bearing of the gas circulating fan. However, it has been hard to use the ball bearing for a long time because a grease necessary for the ball bearing is dried up so that the gas circulating fan is rotated with difficulty or an impurity gas interfering with the operation of the excimer laser apparatus is generated from the grease. In particular, such a tendency has become more remarkable by the implementation of the high-speed rotation of the fan in the corrosive gas atmosphere. Consequently, it has been proposed that a magnetic bearing capable of supporting the rotary shaft of the gas circulating fan in non-contact is applied.

As an example of a magnetic bearing for the excimer laser apparatus, JP-A-10-173259 has disclosed a magnetic bearing of a passive type having such a structure that, in a laser chamber 1 formed by a housing 55 to be also used as a shield partition wall 56, a rotary shaft 30 with a gas circulating fan 4 attached thereto is supported in non-contact by a magnetic bearing 20 including a permanent magnet 22 provided on the rotary shaft 30 side and a permanent magnet 23 provided on a housing 55 side, and the shield partition wall 56 is disposed between a permanent magnet 43 on a magnetic coupling 42 side which is fixed to a shaft 41 of a motor 40 and a permanent magnet 44 provided on the rotary shaft 30 side, as shown in FIG. 4.

In general, the magnetic bearing of a passive type using the permanent magnets 22 and 23 cannot stably support the rotary shaft 30 by itself. Moreover, if the position of the rotary shaft is shifted, it is impossible to control the rotary shaft into a proper position. With such a structure, the shield partition wall 56 provided between the rotary shaft 30 and the magnetic coupling 42 is non-magnetic. Therefore, even if non-magnetic material is used, in case of a metal material such as aluminum or non-magnetic stainless, an eddy current is generated by the rotation of the rotary shaft 30. Due to athe generation of the eddy current, the magnetic force between the permanent magnets 22 and 23 is reduced. In addition, the magnetic force between the permanent magnets 22 and 23 is reduced due to the heat generation of the shield partition wall 56 caused by the generation of the eddy current. Consequently, the holding force of the rotary shaft is reduced to interfere with rotation performance.

As measures to be taken for the drawbacks of such a magnetic bearing of a passive type, U.S. Pat. No. 5,848,089 has disclosed a magnetic bearing of a control type having such a structure that a rotary shaft 130 provided integrally with a gas circulating fan 46 is supported in non-contact by a magnetic bearing comprising a magnetic bearing stator 37 and a magnetic bearing rotor portion 28 in a space sealed with a shield partition wall 36 and is rotated in non-contact through the shield partition wall 36 by means of a brushless DC motor comprising a rotator portion 134 and a stator 140, as shown in FIG. 5.

In the magnetic bearing of a control type, the shield partition wall 36 has such an axially deep and long structure as to include the magnetic bearing rotor portion 28 and the rotor portion 134 of the brushless DC motor. Therefore, the rotary shaft 130 can be supported stably.

In the magnetic bearing of a control type for the conventional excimer laser apparatus, however, the shield partition wall 36 is originally provided in a clearance between the magnetic bearing stator 37 and the magnetic bearing rotor portion 28. Therefore, the thickness of the shield partition wall 36 should be reduced so as to increase magnetic force between the magnetic bearing stator 37 and the magnetic bearing rotor portion 28 as much as possible. In general, a difference in pressure between a laser gas in the laser chamber 1 and an external atmosphere is approximately 3 atm. For this reason, the shield partition wall 36 should have a strength to be resistant to such a difference in pressure. Accordingly, in order to display the performance of the magnetic bearing and to have such a strength as to be fully resistant to the difference in pressure between the laser chamber 1 and the external atmosphere, the shield partition wall 36 having a thin, deep and long structure should be formed of a metal material. Even if the metal material to be used is non-magnetic, an eddy current is generated on the shield partition wall 36 by a rotating magnetic field to generate high heat when the motor is driven in the same manner as in the case of the magnetic bearing of a passive type. Consequently, there has been a problem in that the driving operation of the motor is disadvantageously affected.

SUMMARY OF THE INVENTION

It is an object of the invention to eliminate the drawbacks of the conventional example and to provide an excimer laser apparatus capable of preventing heat from being generated on a shield partition wall of a magnetic coupling portion particularly when the rotating force of a motor is transmitted to a rotary shaft in non-contact, and capable of stably supporting and rotating the rotary shaft for a long time without mixing an impurity gas contaminating a laser gas into a sealed space of the rotary shaft.

In order to achieve the above-mentioned problem, the invention provides an excimer laser apparatus, comprising: a laser chamber to be filled with a laser gas containing a halogen gas; a discharge excitation portion disposed in the laser chamber; a rotary shaft attached with a gas circulating fan for circulating the laser gas in the laser chamber; a magnetic bearing portion supporting the rotary shaft in non-contact; a driving motor rotating the gas circulating fan through the rotary shaft disposed outside the laser chamber; and a magnetic coupling portion for transmitting a rotating force of the driving motor to the rotary shaft in non-contact. A shield partition wall is disposed in a clearance between a stator portion of the magnetic bearing portion and a rotor portion of the magnetic bearing portion fixed to the rotary shaft and a clearance between a driving side magnet of the magnetic coupling portion and a driven side magnet fixed to the rotary shaft, and constructs a part of a side wall of the laser chamber to seal a space including the rotary shaft and connected to the laser chamber. The shield partition wall is formed of metal in the magnetic bearing portion and ceramics in the magnetic coupling portion.

According to the invention, thus, the shield partition wall of the magnetic coupling portion is formed of ceramics. Therefore, when the rotary shaft is rotated by the driving motor, a magnetic field does not cause the generation of high heat and a reduction in magnetic force over the shield partition wall of the magnetic coupling portion. Therefore, it is possible to prevent the motor driving operation from being disadvantageously affected.

Moreover, the shield partition wall of the magnetic bearing portion is formed of metal. Therefore, the thickness of the partition wall can be more reduced as compared with ceramics and a spacing between the rotor portion on the rotary shaft side and the stator portion provided outside the partition wall can be reduced. Furthermore, it is possible to obtain such a structure that a thin partition wall is fully resistant to a difference in pressure inside and outside the chamber.

With such a sealing structure as to hold the rotary shaft in non-contact, the shield partition wall constituted by the portion formed of ceramics and the portion formed of metal can completely perform the sealing. Thus, it is possible to completely prevent the halogen gas in the sealed space from being contaminated by impurities generated on the magnetic bearing, the driving motor or the rotary shaft sensor.

DETAILED DESCRIPTION OF THE PREFERRED EMBODIMENTS

An embodiment of the invention will be described with reference to the drawings.

Figure 1:
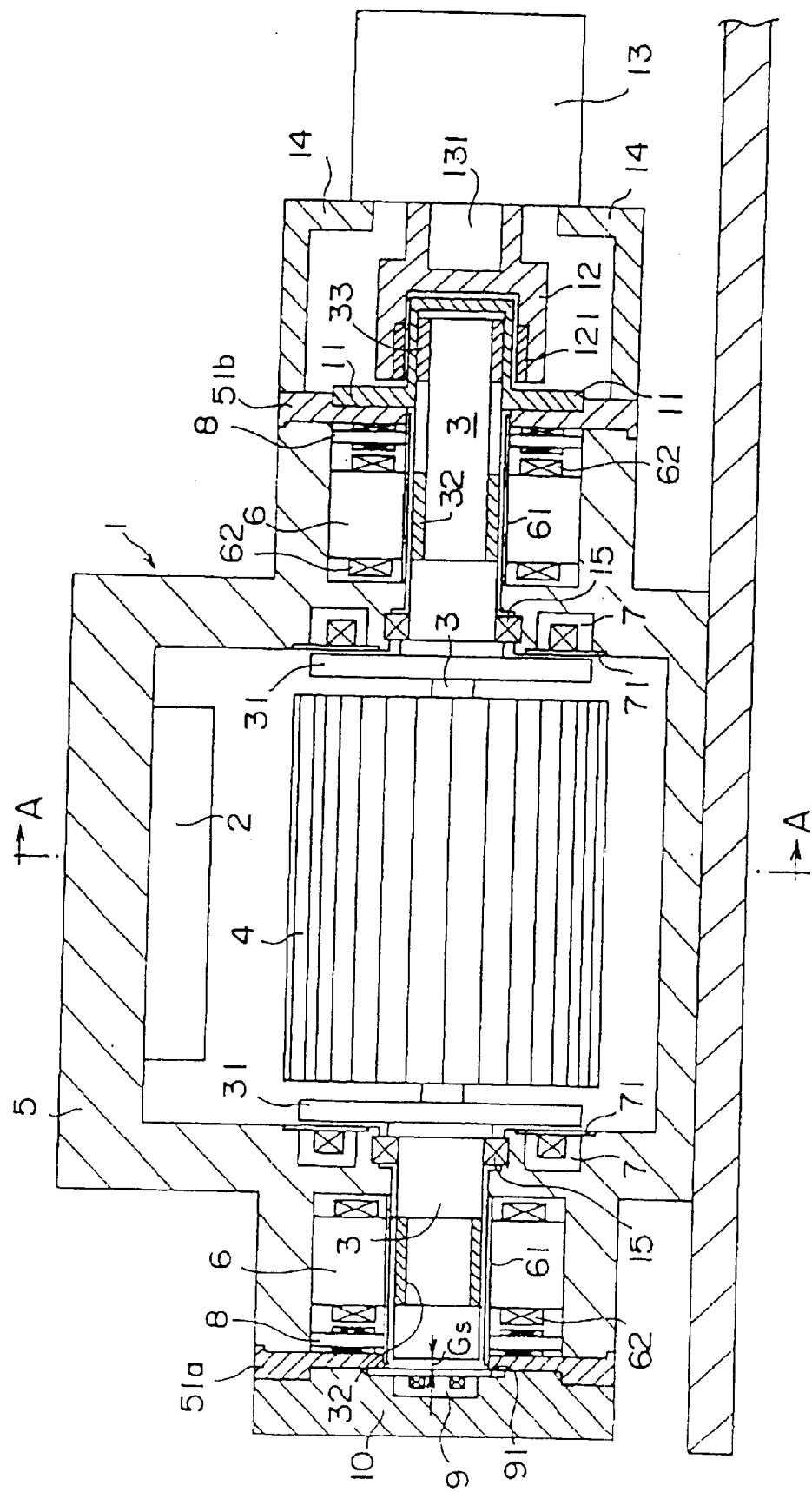
FIG. 1 is a view showing the axially sectional structure of an excimer laser apparatus according to an embodiment of the invention.
Figure 2:
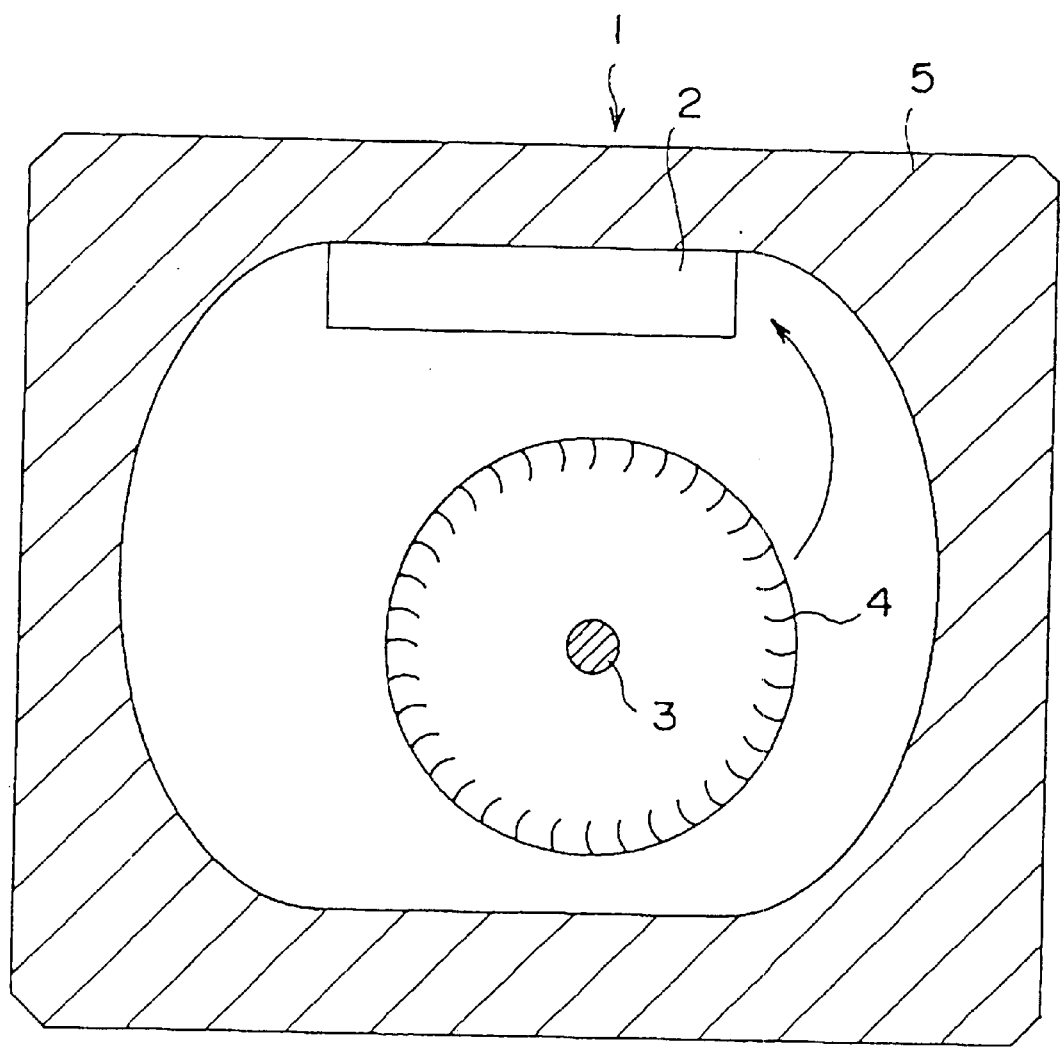
FIG. 2 is a sectional view taken along the line A—A, illustrating the excimer laser apparatus of FIG. 1.
Figure 3:
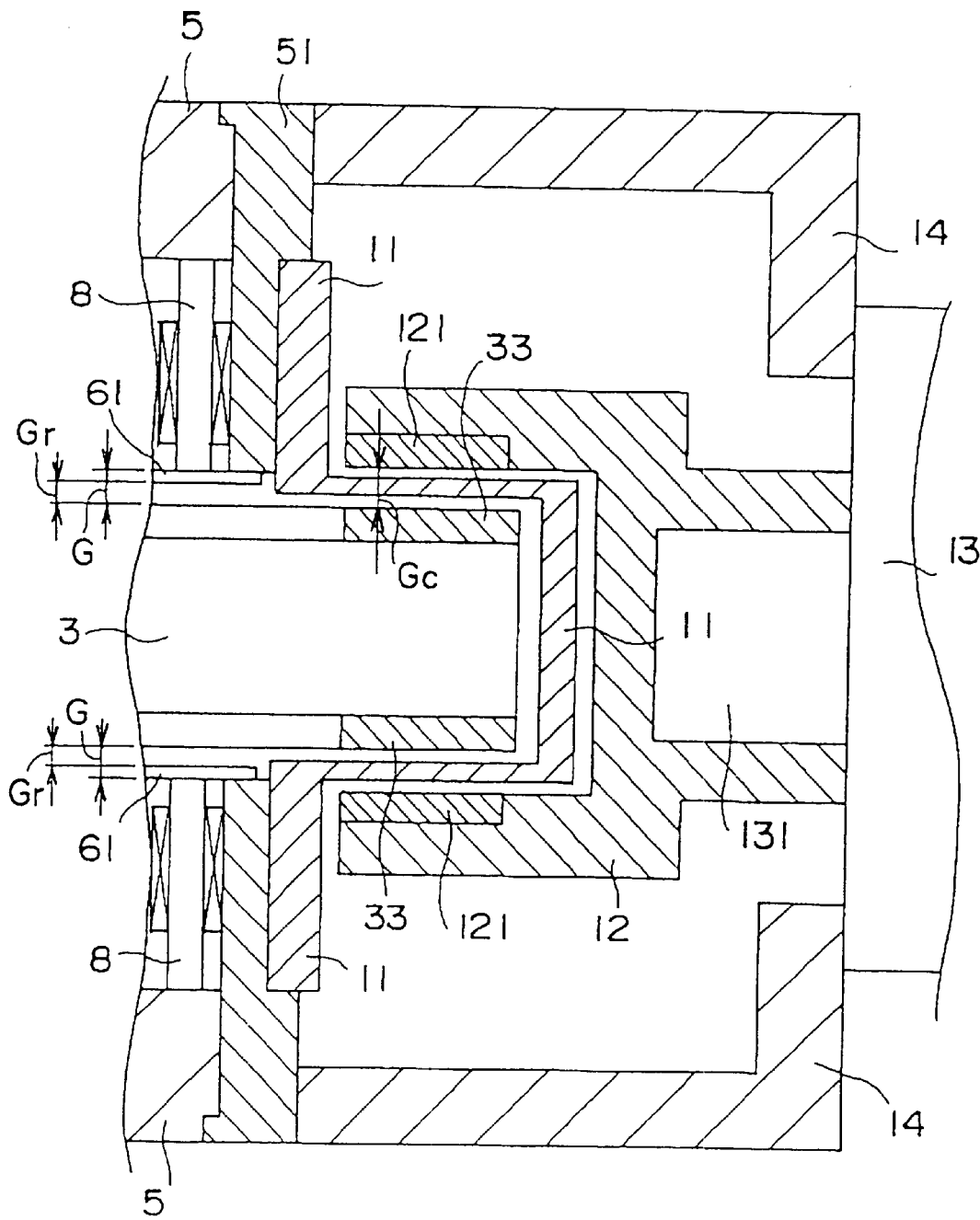
FIG. 3 is an enlarged view showing a magnetic coupling portion of FIG. 1.
Figure 4:
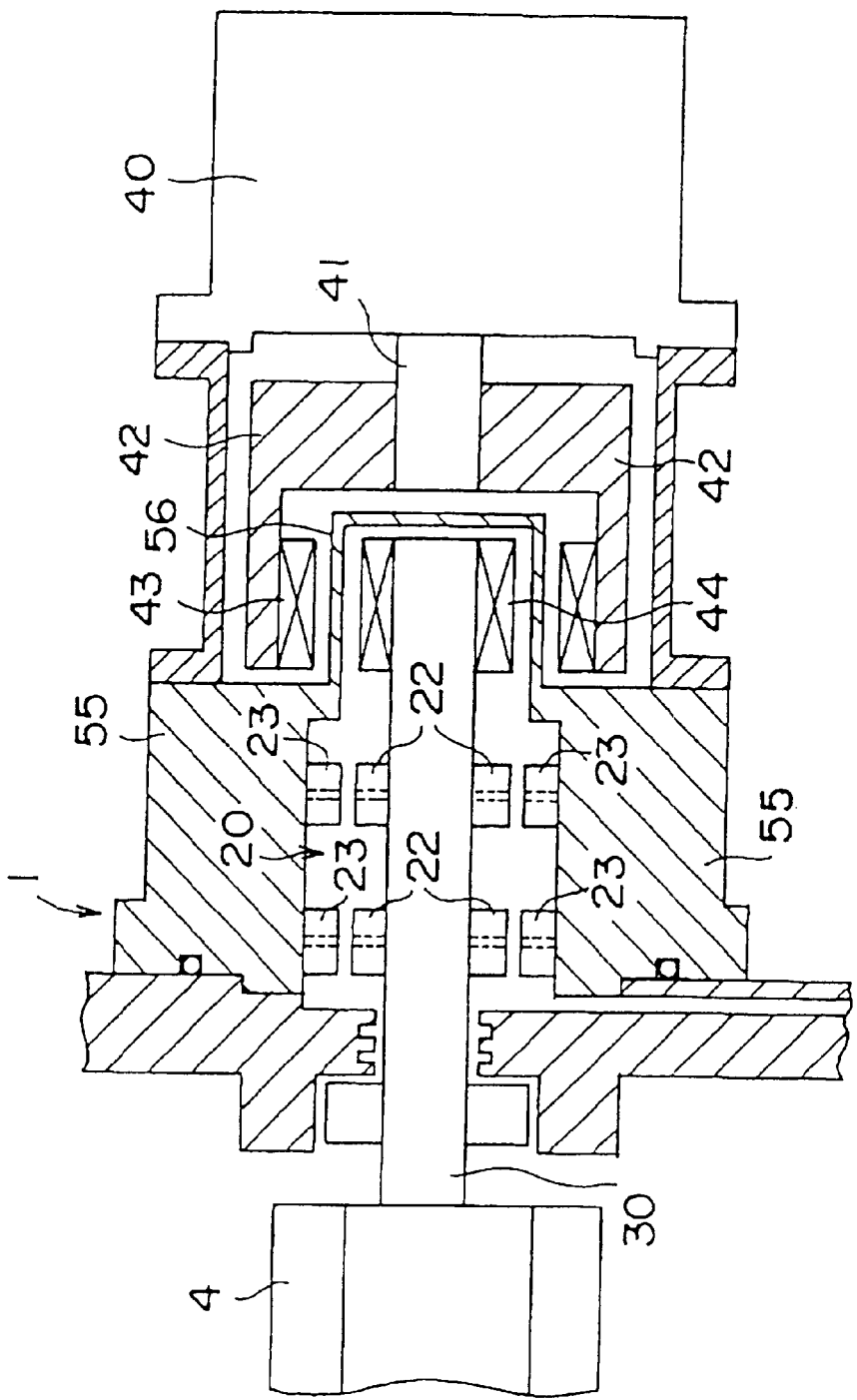
FIG. 4 is a view showing the sectional structure of a magnetic bearing for a conventional excimer laser apparatus of a passive type.
Figure 5:
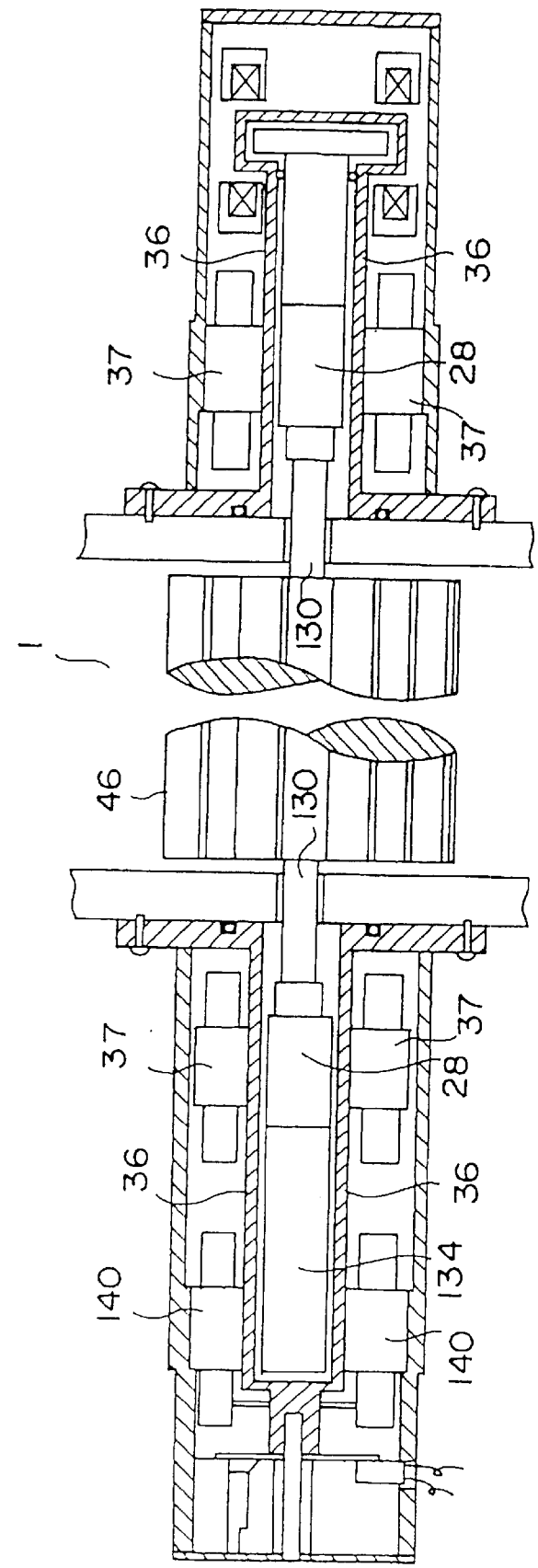
FIG. 5 is a view showing the sectional structure of a magnetic bearing for a conventional excimer laser apparatus of a control type.

FIG. 1 is an axially sectional view showing an excimer laser apparatus according to the embodiment of the invention, FIG. 2 is a sectional view taken along the line A—A, illustrating the excimer laser apparatus of FIG. 1, and FIG. 3 is an enlarged view showing a magnetic coupling portion of FIG. 1.

In FIGS. 1 and 2, the reference numeral 1 denotes a laser chamber; 2, a discharge excitation portion; 3, a rotary shaft; 4, a DC/AC fan as a gas circulating fan, which is fixed to the rotary shaft 3; 5, a chamber housing; 6, a radial magnetic bearing stator to be a stator portion; 7, a thrust magnetic bearing stator; 8, a radial sensor; 9, a thrust sensor; 11, a coupling spacer; 12, a driving side magnetic coupling; 13, a driving motor; 31, a thrust flange; 32, a radial magnetic bearing rotor portion of the rotary shaft 3, to be a rotor portion; 33, a rotary shaft side coupling magnet to be a rotor portion for the driving motor 13; 61, a shield partition wall (radial partition wall). The radial sensor 8 and the thrust sensor 9 are rotary shaft sensors.

The chamber housing 5 is a case forming the whole laser chamber 1, in which the discharge excitation portion 2 is attached to a predetermined position of an internal wall surface thereof, and the rotary shaft 3 fixing the DC/AC fan 4 and the thrust flanges 31 provided on both sides of the DC/AC fan 4 is rotatably supported in a non-contact state in a space formed by the internal wall surface. A sealing housing 10 is provided on a chamber housing sealing end 51a of the left end side of the chamber housing 5 in the drawing, and seals one end side of the laser chamber 1.

The coupling spacer 11 formed of non-magnetic ceramic is fixed as a part of the shield partition wall 61 to a laser chamber housing sealing end 51b fixed to the right end side of the chamber housing 5 in the drawing, and seals the other end side of the laser chamber 1.

The radial bearing rotor portions 32 and 32 are provided in positions on both sides of the DC/AC fan 4 of the rotary shaft 3. The radial magnetic bearing stators 6 and 6 are provided with a gap G (see FIG. 3) in positions on the chamber housing 5 side which are radially opposed to the radial bearing rotor portions 32 and 32, and the radial sensors 8 and 8 are provided adjacently thereto. Radial magnetic bearing coils 62 and 62 are fixed to the radial magnetic bearing stators 6 and 6. A magnetic bearing is constituted by the radial bearing rotor portions 32 and 32 and the radial magnetic bearing stators 6 and 6. Portions of the shield partition walls 61 and 61 which correspond to the magnetic bearing are referred to as magnetic bearing portions.

The shield partition walls 61 and 61 are formed of a non-magnetic metal material and are welded and fixed to the chamber housing 5 and the chamber housing sealing ends 51a and 51b to enclose the rotary shaft 3. As described above, the radial magnetic bearing stators 6 and 6 and the radial sensors 8 and 8 are provided in the sealed space formed by the radial partition walls 61 and 61 and the internal wall of the chamber housing 5. While the shield partition walls 61 and 61 are welded and fixed in the present embodiment, this structure is not restricted but they may be fixed with screws through an O ring.

The radial sensors 8 and 8 detect a change in the positions of the radial bearing rotor portions 32 and 32 as a variation in an inductance through the shield partition walls 61 and 61, and thereby detects a radial displacement in the rotary shaft 3. According to the variation in the inductance, feedback control for controlling a current flowing to the radial magnetic bearing coils 62 and 62 is carried out, so that a constant gap Gr (see FIG. 3) is maintained between the rotary shaft 3 and the shield partition walls 61 and 61 in the radial direction. This is a magnetic bearing of a control type.

The thrust magnetic bearing stators 7 and 7 are provided on the end face of the internal wall of the chamber housing 5 opposite to the thrust flanges 31 and 31 of the rotary shaft 3, and are sealed with thrust bearing partition walls 71 and 71. The thrust sensor 9 is provided in the sealing housing 10 and is sealed within the sealing housing 10 through the thrust sensor partition wall 91. The thrust sensor 9 detects a change in the position of the end face of the rotary shaft 3 as a variation in an inductance through the thrust sensor partition wall 91, and thereby detects a radial displacement in the rotary shaft 3. According to the variation in the inductance, feedback control for controlling a current flowing to the coils of the thrust magnetic bearing stators 7 and 7 is carried out, so that a constant gap Gs (see FIG. 1) is maintained between the end face of the rotary shaft 3 on the thrust sensor 9 side and the thrust sensor partition wall 91 in the axial direction. This is the magnetic bearing of a control type.

As shown in FIG. 3, the rotary shaft side coupling magnet 33 is fixed to the outer peripheral surface of the end on the coupling spacer 11 side of the rotary shaft 3, and is opposed to the inner peripheral surface of the coupling spacer 11 in non-contact.

The driving motor 13 is fixed to the sealed end 51 of the chamber housing 5 by means of a motor mounting portion 14, and a cylindrical driving side magnetic coupling 12 is fixed to the tip of a shaft 131 of the driving motor 13. A driving side magnetic coupling magnet 121 is fixed to the inner peripheral surface side of the driving side magnetic coupling 12, and this portion is provided opposite to the outer peripheral surface of the coupling spacer 11 in non-contact. A gap Gc is provided between the driving side magnetic coupling magnet 121 and the rotary shaft side coupling magnet 33. A magnetic coupling portion is constituted by the driving side magnetic coupling magnet 121, the coupling spacer 11 and the rotary shaft side coupling magnet 33.

As shown in FIG. 1, the chamber housing 5 has a touch-down bearing 15 provided in the vicinity of the thrust magnetic bearing stator 7. The touch-down bearing 15 has the function of stopping the abnormal rotation of the rotary shaft 3 and is usually provided in non-contact with the rotary shaft 3.

Thus, the rotary shaft 3 fitted in the DC/AC fan 4 is held in a space sealed with the coupling spacer 11, the shield partition wall 61 of the chamber housing 5, the thrust bearing partition wall 71 and the thrust sensor partition wall 91 of the sealing housing 10, and is supported in non-contact by magnetic attraction force between the radial bearing rotor portion 32 and the radial magnetic bearing stator 6.

In the invention, the whole sealed space is not formed of a metal material such as the shield partition wall 61, but the magnetic coupling portion opposed to the driving side magnetic coupling 12 of the driving motor 13 uses the coupling spacer 11 made of ceramic. Such a structure is convenient in that the gap G of the magnetic bearing portion should be smaller than the gap Gc of the magnetic coupling portion as shown in FIG. 3.

In general, the gap G of the magnetic bearing (the spacing between the radial bearing rotor portion 32 and the radial magnetic bearing stator 6) should be set to have a very small value of 1 mm or less, for example, 0.2 to 0.8 mm in respect of controllability, while the gap Gc of the magnetic coupling portion (the spacing between the driving side magnetic coupling magnet 121 and the rotary shaft side coupling magnet 33) may be several mm to approximately 10 mm which is greater than that of the magnetic bearing because the magnetic coupling portion serves to only transmit rotation.

Accordingly, although a metallic non-magnetic material capable of forming a very thin wall can be used for the shield partition wall 61, the thrust shield partition wall 71 and the thrust sensor partition wall 91 in the magnetic bearing portion, ceramic cannot form a thinner wall differently from the metal material and can be used for only the magnetic coupling portion which may be thick to some extent. In the case in which the whole inner peripheral surface including the shield partition wall 61 of the sealed space is formed of ceramics in order to prevent high heat from being generated due to an eddy current, an insufficient strength is obtained and a cost is increased in consideration of the present circumstances of the ceramics.

In the above-mentioned structure, the rotary shaft 3 is rotated by the transmission of the driving force of the driving motor 13 through the driving side magnetic coupling 12 and the coupling spacer 11. In this case, the driving force of the driving motor 13 is transmitted to the rotary shaft 3 by non-contact coupling force obtained through magnetic force between the driving side magnetic coupling magnet 121 of the driving side magnetic coupling 12 and the rotary shaft side coupling magnet 33 of the rotary shaft 3.

By the rotation of the gas circulating fan 4, a laser gas containing a halogen gas in the sealed space of the laser chamber 1 is circulated as shown in an arrow of FIG. 2.

As an example, the gas circulating fan 4 having a size of 150 mm in a diameter and 700 mm in a length can be rotated at 5000 rpm. The chamber contains 0.1% of fluorine and has a total pressure of 4 atm.

At this time, a pollutant does not flow from the radial magnetic bearing rotor portion 6, the thrust magnetic bearing rotor portion 7, the radial sensor 8, the thrust sensor 9 and the driving motor 13 into the sealed space in which the rotary shaft 3 is provided. Conversely, those parts are not damaged by the halogen gas having high corrosiveness. Therefore, the durability of the parts can be enhanced.

The material of the coupling spacer 11 opposed to the driving side magnetic coupling 12 in non-contact is non-conductive ceramics. Therefore, when the driving motor 13 is rotated so that the driving side magnetic coupling magnet 121 of the driving side magnetic coupling 12 and the rotary shaft side coupling magnet 33 are magnetically coupled and rotated through the coupling spacer 11, the eddy current is not generated in the coupling spacer 11 by a rotating magnetic field passing through the coupling spacer 11. Consequently, it is possible to prevent high heat from being generated.

According to the invention described above, the shield partition wall of the magnetic coupling portion is formed of ceramics. Differently from the conventional example, therefore, the motor driving operation can be prevented from being disadvantageously affected by the eddy current over the shield partition wall to generate high heat. Furthermore, it is possible to prevent the consumed power of the driving motor from being increased.

Moreover, the sealed space supporting the rotary shaft in non-contact is completely sealed with the shield partition wall formed of ceramic. Therefore, it is possible to completely prevent the halogen gas in the space from being contaminated by impurities generated on the magnetic bearing, the driving motor or the sensor. Thus, the rotary shaft can be stably supported and rotated for a long time in the sealed space.

Furthermore, the sealing properties can prevent the parts such as the magnetic bearing, the driving motor and the sensor from being damaged by the halogen gas having high corrosiveness in the laser chamber. Therefore, the durability of these parts can be enhanced.

While only certain embodiments of the invention have been specifically described herein, it will apparent that numerous modifications may be made thereto without departing from the spirit and scope of the invention.

What is claimed is:

1. An excimer laser apparatus, comprising:
   a laser chamber to be filled with a laser gas containing a halogen gas;
   a discharge excitation portion disposed in the laser chamber;
   a rotary shaft attached with a gas circulating fan for circulating the laser gas in the laser chamber;
   a magnetic bearing portion supporting the rotary shaft in non-contact, said magnetic bearing portion including a stator portion and a rotor portion fixed to the rotary shaft;
   a driving motor rotating the gas circulating fan through the rotary shaft disposed outside the laser chamber;
   a magnetic coupling portion for transmitting a rotating force of the driving motor to the rotary shaft in non-contact, said magnetic coupling portion including a driving side magnet and a driven side magnet fixed to the rotary shaft; and
   a shield partition wall constructing a part of a side wall of the laser chamber and a space which connects to the laser chamber and includes the rotary shaft so as to seal the laser chamber and the space, the shield partition wall including:
     a first shield partition wall disposed in a first clearance disposed between the stator portion and the rotor portion of the magnetic bearing portion; and
     a second shield partition wall disposed in a second clearance between the driving side magnet and the driven side magnet of the magnetic coupling portion,
     wherein the first shield partition wall is formed of metal and the second shield partition wall is formed of ceramic.

2. The excimer laser apparatus according to claim 1, wherein the magnetic bearing portion includes a magnetic bearing of a control type and a rotary shaft sensor is disposed outside the shield partition wall.

3. The excimer laser apparatus according to claim 2, wherein the rotary shaft sensor includes a radial sensor detecting a displacement of the rotary shaft in a radial direction thereof and a thrust sensor detecting a displacement of the rotary shaft in a thrust direction thereof.

4. The excimer laser apparatus according to claim 3, wherein the shield partition wall further includes a third shield partition wall disposed in a clearance between the thrust sensor and the rotary shaft.

5. The excimer laser apparatus according to claim 1, wherein the first shield partition wall is formed thinner than the second shield partition wall.

6. The excimer laser apparatus according to claim 1, wherein the first clearance is set to be smaller than the second clearance.

* * * * *